US012676346B2

(12) United States Patent
Song et al.

(10) Patent No.: US 12,676,346 B2
(45) Date of Patent: Jul. 7, 2026

(54) GAS SUPPRESSION DEVICE AND METHOD FOR LITHIUM-SULFUR BATTERY

(71) Applicant: LG ENERGY SOLUTION, LTD., Seoul (KR)

(72) Inventors: Min-Sun Song, Daejeon (KR); Hyun-Soo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 523 days.

(21) Appl. No.: 18/240,025

(22) Filed: Aug. 30, 2023

(65) Prior Publication Data

US 2024/0072314 A1 Feb. 29, 2024

(30) Foreign Application Priority Data

Aug. 31, 2022 (KR) ........................ 10-2022-0110383
Dec. 23, 2022 (KR) ........................ 10-2022-0183789

(51) Int. Cl.
| | |
|---|---|
| *H01M 10/633* | (2014.01) |
| *H01M 4/04* | (2006.01) |
| *H01M 10/052* | (2010.01) |
| *H01M 10/42* | (2006.01) |
| *H01M 10/48* | (2006.01) |

(52) U.S. Cl.
CPC ..... *H01M 10/4257* (2013.01); *H01M 4/0447* (2013.01); *H01M 10/052* (2013.01); *H01M 10/486* (2013.01); *H01M 10/633* (2015.04); *H01M 2010/4271* (2013.01); *H01M 2200/10* (2013.01)

(58) Field of Classification Search
None
See application file for complete search history.

(56) References Cited

U.S. PATENT DOCUMENTS

| | | |
|---|---|---|
| 2008/0311475 A1 | 12/2008 | Manev et al. |
| 2011/0129723 A1 | 6/2011 | Tsuchida |
| 2012/0043942 A1 | 2/2012 | Tamane et al. |
| 2019/0051940 A1 | 2/2019 | Park et al. |
| 2022/0299572 A1 | 9/2022 | Aoki |

FOREIGN PATENT DOCUMENTS

| | | |
|---|---|---|
| CN | 101743678 A | 6/2010 |
| JP | 2004-296179 A | 10/2004 |
| JP | 2008198489 A | 8/2008 |
| JP | 2021-44076 A | 3/2021 |
| JP | 2021-044860 A | 3/2021 |
| JP | 2021082555 A | 5/2021 |
| JP | 6934620 B2 | 8/2021 |
| KR | 10-1602466 B1 | 3/2016 |
| KR | 20170067648 A | 6/2017 |

(Continued)

*Primary Examiner* — Carlos Barcena
(74) *Attorney, Agent, or Firm* — Bryan Cave Leighton Paisner LLP

(57) ABSTRACT

A gas suppression device for a lithium-sulfur battery includes a voltage measurement unit to measure a voltage of the lithium-sulfur battery; a current application unit to apply an electric current; and a control unit configured to control the current application unit to maintain the voltage of the lithium-sulfur battery within a predetermined range based on a voltage measurement result of the voltage measurement unit, to suppress gas generation in the lithium-sulfur battery having gone through an activation step.

16 Claims, 5 Drawing Sheets

(56)                          References Cited

FOREIGN PATENT DOCUMENTS

| KR | 10-2017-0110434 | A  | 10/2017 |
|----|-----------------|----|---------|
| KR | 10-1887709      | B1 | 8/2018  |
| KR | 10-1999773      | B1 | 7/2019  |
| KR | 20190088610     | A  | 7/2019  |
| KR | 10-2099691      | B1 | 4/2020  |
| WO | 2011027430      | A1 | 3/2011  |
| WO | 2021/048587     | A1 | 3/2021  |

GAS SUPPRESSION DEVICE AND METHOD FOR LITHIUM-SULFUR BATTERY

TECHNICAL FIELD

The present disclosure relates to a gas suppression device and method for a lithium-sulfur battery.

The present application claims priority to Korean Patent Application No. 10-2022-0110383 filed on Aug. 31, 2022 and Korean Patent Application No. 10-2022-0183789 filed on Dec. 23, 2022 in the Republic of Korea, the disclosures of which are incorporated herein by reference.

BACKGROUND ART

As there is increasing attention being paid to energy storage technology, with an extended range of applications as sources of energy for mobile phones, tablets, laptop computers, camcorders, electric vehicles (EVs) and hybrid electric vehicles (HEVs), and energy storage devices and systems, more efforts are being made in the research and development of electrochemical devices. In this aspect, in the field of electrochemical devices that is attracting most attention is the development of rechargeable secondary batteries. In the development of rechargeable secondary batteries, research and development for new design of electrodes in rechargeable secondary batteries are being made to improve the storage capacity and specific energy density.

Among the rechargeable secondary batteries, lithium-sulfur (LiS) batteries are attaining the center of attention as the next-generation secondary batteries that can replace lithium-ion batteries due to their high energy density in EVs and HEVs, and energy storage devices and systems. Lithium-sulfur is used as positive electrode active materials, and in lithium-sulfur batteries, reduction reaction of sulfur and oxidation reaction of lithium metal occurs during discharging, and in this instance, sulfur forms lithium polysulfide ($Li_2S_2$, $Li_2S_4$, $Li_2S_6$, $Li_2S_8$) of a linear structure from $S_8$ of a ring structure, and lithium-sulfur batteries show a gradual discharge voltage until the polysulfide (PS) is completely reduced to LiS.

However, since lithium polysulfide, an intermediate product of the lithium-sulfur battery, is easily soluble in an electrolyte, dissolution continues during discharge reaction, resulting in decrease of the amount of positive electrode active materials, and gas is generated by the reaction with the electrolyte. Eventually, the battery degrades faster and the generated gas expands the volume of the battery, thereby failing to ensure stability. In particular, in many instances, the lithium-sulfur battery may be exposed to high temperature, and in this case, the above-described problem may be more serious. The lithium-sulfur battery are not particularly resilient to high temperatures, and when exposed to high temperature, gas generated by the reaction with the electrolyte may be accelerated.

Attempts have been made to suppress gas by generating gas beforehand in the process of manufacturing lithium-sulfur batteries and removing the gas. However, this method falls short in preventing gas generation after the manufactured lithium-sulfur batteries are mounted in EVs and HEVs, and energy storage devices and systems.

To suppress or prevent gas generation, much research and development are being done. This includes, for example, providing a coating on the positive electrode, adding additives in the separator, or adding additives in the electrolyte of the lithium-sulfur battery. However, still more needs to be done.

SUMMARY

Technical Problem

To overcome the above-described disadvantage, the present disclosure is directed to providing a device and method for suppressing gas generation in a lithium-sulfur battery.

Technical Solution

The inventors found that the above-described problem may be solved through a gas suppression device described below and a method comprising the same.

A first embodiment relates to a gas suppression device for suppressing gas generation in a lithium-sulfur battery having gone through an activation step, including a voltage measurement unit configured to measure a voltage of the lithium-sulfur battery; a current application unit configured to apply an electric current to the lithium-sulfur battery; and a control unit configured to control the current application unit to maintain the voltage of the lithium-sulfur battery within a predetermined range based on a voltage measurement result of the voltage measurement unit.

A second embodiment relates to the gas suppression device for the lithium-sulfur battery according to the first embodiment, where the control unit is configured to compare the voltage measured by the voltage measurement unit with a preset reference voltage, and when the voltage measured by the voltage measurement unit is less than the reference voltage, control the current application unit to apply the electric current to the lithium-sulfur battery.

A third embodiment relates to the gas suppression device for the lithium-sulfur battery according to the first or second embodiment, further including a receiving unit to receive the lithium-sulfur battery; and a temperature measurement unit to measure a temperature in the receiving unit, where the control unit is configured to adjust a voltage measurement cycle of the voltage measurement unit according to the temperature measured by the temperature measurement unit.

A fourth embodiment relates to the gas suppression device for the lithium-sulfur battery according to any one of the first to third embodiments, further including a receiving unit configured to receive the lithium-sulfur battery; and a temperature adjustment unit configured to adjust a temperature in the receiving unit.

A fifth embodiment relates to the gas suppression device for the lithium-sulfur battery according to any one of the first to fourth embodiments, where the current application unit is configured to apply the electric current of 0.01 C or less to the lithium-sulfur battery.

A sixth embodiment relates to the gas suppression device for the lithium-sulfur battery according to any one of the first to fifth embodiments, where the lithium-sulfur battery is not more than 24 hours after the activation step. The lithium-sulfur battery is within 24 hours from the end of the activation step, that is to say, immediately after the completion of the activation step.

A seventh embodiment relates to the gas suppression device for the lithium-sulfur battery according to any one of the first to sixth embodiments, where the lithium-sulfur battery is charged such that a state of charge (SOC) is 90% or more.

An eighth embodiment relates to a gas suppression method for suppressing gas generation in a lithium-sulfur battery having gone through an activation step, including measuring a voltage of the lithium-sulfur battery after a lapse of a predetermined time; performing control to apply an electric current to maintain the voltage of the lithium-sulfur battery within a predetermined range based on a voltage measurement result; and applying the electric current to maintain the voltage of the lithium-sulfur battery within the predetermined range by the control. The gas suppression method for the lithium-sulfur battery may be performed using the gas suppression device according to any one of the first to seventh embodiments. The activation step, i.e., the activation step that the lithium-sulfur battery has undergone may be earlier than the step of measuring the voltage.

A ninth embodiment relates to the gas suppression method for the lithium-sulfur battery according to the eighth embodiment, where the control step comprises comparing the measured voltage with a reference voltage (for example, a preset reference voltage), and when the measured voltage in the measurement step is less than the reference voltage, performing control to apply the electric current to the lithium-sulfur battery.

A tenth embodiment relates to the gas suppression method for the lithium-sulfur battery according to the eighth or ninth embodiment, where the lithium-sulfur battery is received in a receiving unit, where the method further comprises measuring a temperature at the receiving unit, and where the voltage measurement step comprises adjusting a voltage measurement cycle according to the measured temperature at the receiving unit.

An eleventh embodiment relates to the gas suppression method for the lithium-sulfur battery according to the tenth embodiment, further including adjusting the temperature in the receiving unit according to the measured temperature.

A twelfth embodiment relates to the gas suppression method for the lithium-sulfur battery according to any one of the eighth to eleventh embodiments, where the current application step comprises applying the electric current with 0.01 C or less. For example, the electric current of 0.01 A per second is applied to the lithium-sulfur battery.

A thirteenth embodiment relates to the gas suppression method for the lithium-sulfur battery according to any one of the eighth to twelfth embodiments, where the lithium-sulfur battery is received in a battery case, and where the current application step comprises applying the electric current such that a volume change of the battery case is 1% or less.

A fourteenth embodiment relates to the gas suppression method for the lithium-sulfur battery according to any one of the eighth to thirteenth embodiments, where the activation step comprises a process of charging and discharging the lithium-sulfur battery at least once.

A fifteenth embodiment relates to the gas suppression method for the lithium-sulfur battery according to any one of the eighth to fourteenth embodiments, where the activation step comprises charging and discharging the lithium-sulfur battery with the electric current of 0.02 C to 5 C.

A sixteenth embodiment relates to the gas suppression method for the lithium-sulfur battery according to any one of the eighth to fifteenth embodiments, where the lithium-sulfur battery is free of gas generated in the activation step.

The embodiments described above are equally applicable to electric vehicles or energy storage devices and systems that include a battery management system and a battery pack.

Advantageous Effects

According to an aspect of the present disclosure, it may be possible to effectively suppress gas generation in the lithium-sulfur battery. In particular, in the case of the present disclosure, when the lithium-sulfur battery is stored or installed in a high temperature environment, it may be possible to suppress gas generation by a relatively straightforward method.

Further, according to an aspect of the present disclosure, it may be possible to suppress the production of lithium polysulfide during discharging of the lithium-sulfur battery. Accordingly, it may be possible to suppress gas generated by the dissolution of lithium polysulfide in electrolyte solutions, and prevent cell degradation by the chemical reaction of lithium polysulfide with inorganic solvents or lithium salts.

Furthermore, the present disclosure may have many other effects, and the effects may be described in each embodiment, but description of the effects that can be easily inferred by those skilled in the art may be omitted.

DESCRIPTION OF DRAWINGS

The accompanying drawings illustrate exemplary embodiments of the present disclosure, and together with the foregoing disclosure, serve to provide further understanding of the technical aspect of the present disclosure, and thus the present disclosure should not be construed as being limited to the drawings.

DETAILED DESCRIPTION

Figure 1:
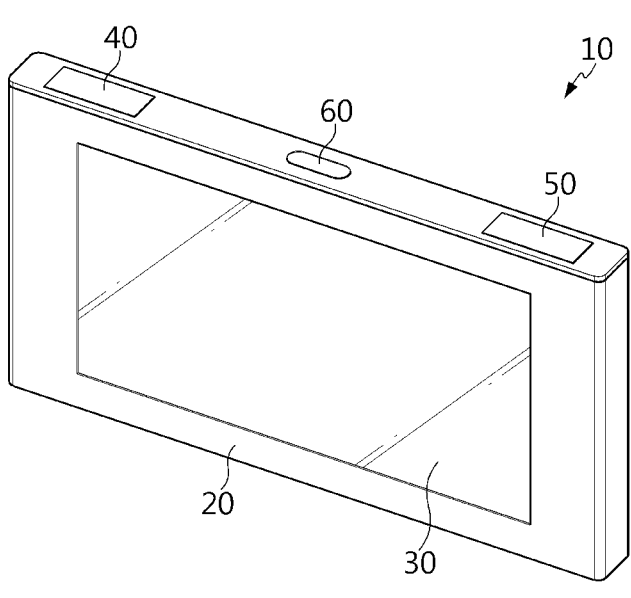
FIG. 1 is a perspective view of a lithium-sulfur battery according to an aspect of the present disclosure.

Hereinafter, the present disclosure will be described in detail with reference to the accompanying drawings. It should be understood that the terms or words used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation.

Therefore, the embodiments proposed herein and the illustrations shown in the drawings are exemplary embodiments of the present disclosure, to describe the technical aspect of the present disclosure and are not intended to be limiting, and thus it should be understood that a variety of other equivalents and modifications could have been made thereto at the time that the application was filed.

It should be further understood that "comprising" when used in this specification, specifies the presence of stated elements, but does not preclude the presence or addition of one or more other elements unless expressly stated otherwise. However, the terms "comprising", "including" and "containing" may have the meaning of "consisting of" unless explicitly excluded.

In the present disclosure, "A and/or B" refers to either A or B or both.

The term "polysulfide (PS)" as used herein is the concept including "polysulfide ion ($S_x^{2-}$, x=8, 6, 4, 2))" and "lithium polysulfide ($Li_2S_x$ or $LiS_x$, x=8, 6, 4, 2)".

In the present disclosure, similar units may be provided with same reference numbers although they are in different aspects of the present disclosure.

"unit" refers to at least one of an electrical circuit, an electrical circuit executing instructions, a logical electric circuit, and a device that performs the function described in the disclosure.

A gas suppression device according to an aspect of the present disclosure may be a device for suppressing gas generation in a lithium-sulfur battery having gone through an activation step. In particular, the gas suppression device according to the present disclosure may be suitable for the suppression of gas generation in the lithium-sulfur battery, and here, the lithium-sulfur battery may be provided after the application of the activation step as described herein to the lithium-sulfur battery.

The activation step may include a formation process and a degassing process. Here, the formation process refers to a process of determining the capacity of the battery by charging and discharging the battery and activating the battery, and for example, the lithium-sulfur battery may be activated by charging/discharging the lithium-sulfur battery with electric current of 0.02 C to 5 C. The degassing process refers to a process of removing gas generated in the formation process. In the activation step, gas may be generated by applying an electric current to the lithium-sulfur battery, and the generated gas may be removed. However, apart from applying the electric current to the lithium-sulfur battery in the activation step, the device according to the present disclosure may suppress gas generation by applying the electric current to the lithium-sulfur battery having gone through the activation step. For example, the lithium-sulfur battery may be manufactured and stored or installed in electronic and electrical devices, EVs and HEVs, and energy storage devices and systems.

FIG. 1 is a perspective view of a lithium-sulfur battery according to an aspect of the present disclosure.

A shape of a battery case 20 of the lithium-sulfur battery 10 may be a coin type, a cylindrical type, a prismatic type or a pouch type. An electrode assembly 30 disposed in the battery case 20 is a chargeable and dischargeable power generating device having a structure in which a positive electrode, a negative electrode, and a separator are stacked.

The electrode assembly 30 may be a jelly-roll type electrode assembly in which the separator is interposed between the positive electrode and the negative electrode, each of which is provided in a form of a sheet and the positive electrode, the separator, and the negative electrode are wound; a stack type electrode assembly in which a plurality of positive and negative electrodes with a separator interposed therebetween are sequentially stacked; or a stack/ folding type electrode assembly in which stack type unit cells are wound with a separator having a long length.

The battery case may contain an electrolyte which acts as a conduit for the electrode assembly during charging and discharging. The electrolyte may be a liquid or a solid, and for example, a liquid organic electrolyte such as an ether based electrolyte may be contemplated but is not limited thereto. Other liquid or solid based electrolyte may be used.

The positive electrode and the negative electrode may be respectively connected to a positive electrode lead 40 and a negative electrode lead 50. FIG. 1 illustrates a lithium-sulfur battery in which the positive electrode lead 40 and the negative electrode lead 50 are disposed together on a top surface of the battery case 20. In addition, FIG. 1 illustrates a venting part 60 provided for the safety of the lithium-sulfur battery disposed between the positive electrode lead and the negative electrode lead at the top surface of the battery case 20. For example, when an internal pressure of the lithium-sulfur battery is abnormally increased and the venting part 60 is activated, the venting part 60 provides for a discharge of the lithium-sulfur battery. The discharging and charging of the lithium-sulfur battery include lithium deintercalation from the negative electrode during discharging and lithium intercalation to the negative electrode during charging, and may be expressed as follows:

Discharging:

Sulfur receives $Li^+$ ions and electrons and gets reduced $$S_8 + 16Li^+ + 16e^- \rightarrow 8L_2S$$

Li metal provides $Li^+$ ions and electrons and get oxidized $$Li \rightarrow Li^+ + e^-$$

Charging:

Sulfur provides $Li^+$ ions and electrons and gets oxidized $$8L_2S \rightarrow S_8 + 16Li^+ + 16e$$

Li metal receives $Li^+$ ions and electrons and get reduced $$Li^+ + e^- \rightarrow Li$$

Figure 2:
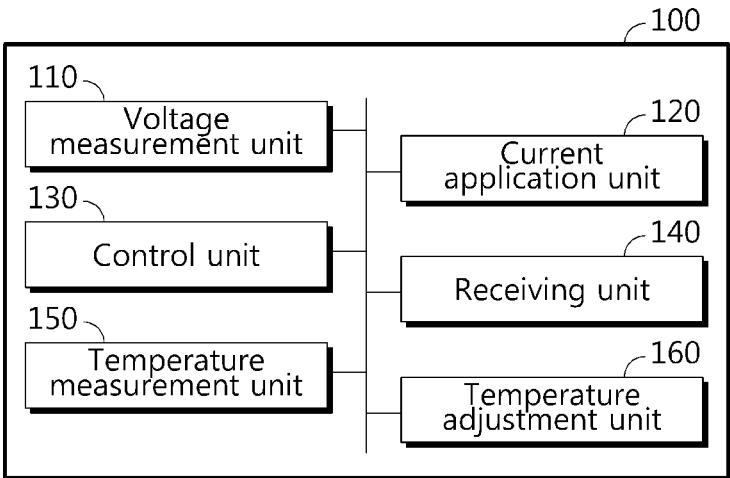
FIG. 2 is a schematic block diagram of a gas suppression device according to an aspect of the present disclosure.

FIG. 2 is a block diagram schematically showing a configuration of a gas suppression device 100 according to an aspect of the present disclosure.

Referring to FIG. 2, the gas suppression device 100 according to an aspect of the present disclosure may include a voltage measurement unit 110, a current application unit 120 and a control unit 130.

The voltage measurement unit 110 may be configured to measure a voltage of the lithium-sulfur battery. The voltage measurement unit 110 may measure the voltage using a voltage sensor. Specifically, the voltage measurement unit 110 may further include a positive electrode contact terminal and a negative electrode contact terminal. Here, the positive electrode contact terminal and the negative electrode contact terminal may be configured to contact the positive electrode lead and the negative electrode lead electrically connected to the electrode assembly of the lithium-sulfur battery 10, respectively. In this exemplary configuration, the voltage measurement unit 110 may measure the voltage of the lithium-sulfur battery 10 with the positive electrode contact terminal and the negative electrode contact terminal being in contact with the positive electrode lead and the negative electrode lead of the lithium-sulfur battery 10, respectively. Additionally, the voltage measurement unit 110 may send the measured voltage measurement result to the control unit 130.

The current application unit 120 may be configured to apply an electric current to the lithium-sulfur battery 10.

Specifically, the current application unit 120 may apply the electric current to the lithium-sulfur battery 10 using the positive electrode contact terminal and the negative electrode contact terminal included in the voltage measurement unit 110. Alternatively, the current application unit 120 may include a separate positive electrode contact terminal and a separate negative electrode contact terminal being in contact with the positive electrode lead and the negative electrode lead of the lithium-sulfur battery 10, respectively. The current application unit 120 may apply the electric current to the lithium-sulfur battery 10 using the same.

The control unit 130 may be configured to receive the voltage measurement result of the voltage measurement unit 110. The control unit 130 may also be configured to control the current application unit 120. For example, the control unit 130 may control a magnitude of the electric current or the quantity or the duration of electric current supply of the current application unit 120. To this end, the control unit 130 may provide a control signal to the current application unit 120. The control unit may be, for example, a microprocessor or a logical electric circuit. The control unit may execute instructions stored in a memory such as a semiconductor memory or external storage media, for example, to perform the required functions.

The control unit 130 may maintain the voltage of the lithium-sulfur battery 10 within a predetermined range through the control over the current application unit 120. In particular, the control unit 130 may control the current application of the current application unit 120 using the measurement result of the voltage measurement unit 110.

According to this exemplary configuration of the gas suppression device 100 of the present disclosure, it may be possible to suppress gas generation in the lithium-sulfur battery 10. In particular, since the gas generation in the lithium-sulfur battery 10 is suppressed, it may be possible to prevent the swelling of the lithium-sulfur battery 10, and thereby reduce damage to the lithium-sulfur battery or explosion risks.

Further, according to the exemplary configuration of the gas suppression device 100 of the present disclosure, it may be possible to prevent a discharge of the lithium-sulfur battery 10 over a predetermined level. In particular, during discharging of the lithium-sulfur battery 10, lithium polysulfide, the intermediate reaction product of the positive electrode active material, is easily soluble in an electrolyte solution. Since the discharge of the lithium-sulfur battery 10 may be prevented by the gas suppression device 100 according to the present disclosure, it may be possible to prevent the dissolution and reaction of lithium polysulfide in the electrolyte solution. Additionally, since the dissolution of lithium polysulfide in the electrolyte solution may be prevented, it may be possible to prevent the decrease of the amount of positive electrode active materials, and degradation of the electrolyte solution.

In particular, according to an exemplary configuration of the gas suppression device 100 of the present disclosure, it may be possible to effectively suppress gas generation when the lithium-sulfur battery 10 is stored in a high temperature environment above the room temperature (for example, 23° C.). For example, when the lithium-sulfur battery 10 is stored at 30° C. or more or 40° C. or more, gas may be easily generated. In this instance, when the gas suppression device 100 according to the present disclosure is applied to the lithium-sulfur battery 10, it may be possible to suppress gas generation in the lithium-sulfur battery in a relatively straightforward manner.

In an embodiment of the present disclosure, the control unit 130 may be configured to compare the voltage measured by the voltage measurement unit 110 with a preset reference voltage. Here, the reference voltage may be preset on the basis of the full charge voltage of the lithium-sulfur battery 10. For example, the reference voltage may be set to a voltage corresponding to 90%, 95%, 98% or 100% of the full charge voltage of the lithium-sulfur battery 10. However, the reference voltage may be variously set according to conditions such as the type or the manufacturing or storage method or installed device, vehicles or systems of the lithium-sulfur battery 10. The reference voltage may be stored in a memory (for example, a semiconductor memory) embedded in the control unit 130 or external storage media.

Additionally, the control unit 130 may be configured to determine if the voltage measured by the voltage measurement unit 110 is less than the reference voltage. For example, in case that the reference voltage is set to 2.4V, the control unit 130 may determine if the voltage measured by the voltage measurement unit 110 is less than 2.4V. Additionally, when the measured voltage is less than the reference voltage, the control unit 130 may control the current application unit 120 to apply an electric current to the lithium-sulfur battery 10. For example, as in the above embodiment, in case that the reference voltage is set to 2.4V, when the measured voltage of the lithium-sulfur battery 10 is less than 2.4V, for example, 2.39V, the control unit 130 may control the current application unit 120 to apply the electric current to the lithium-sulfur battery 10.

According to the embodiment of the present disclosure, it may be possible to further improve the gas suppression effect of the lithium-sulfur battery 10. In particular, lithium polysulfide may be produced during discharging of the lithium-sulfur battery 10, and as in the above-described embodiment, the electric current may be applied immediately when the lithium-sulfur battery 10 is discharged by setting the reference voltage close to the full charge voltage of the lithium-sulfur battery 10. Accordingly, in this case, it may be possible to effectively suppress the production of lithium polysulfide, thereby suppressing gas generation in the lithium-sulfur battery 10 more effectively.

In an embodiment of the present disclosure, the voltage measurement unit 110 of the gas suppression device 100 according to the present disclosure may be configured to measure the voltage of the lithium-sulfur battery 10 periodically or aperiodically.

In a specific example, the voltage measurement unit 110 may be configured to periodically measure the voltage of the lithium-sulfur battery 10 at an interval of 0.01 sec to 1 hour, 0.01 sec to 10 min, or 5 sec. Alternatively, the voltage measurement unit 110 may measure the voltage in each specific cycle within the range of 0.01 sec to 100 sec. However, the voltage measurement cycle may change according to situations such as the type or surrounding temperature of the lithium-sulfur battery 10.

In an embodiment of the present disclosure, the gas suppression device 100 according to the present disclosure may further include a receiving unit 140 for receiving one or more lithium-sulfur batteries. Otherwise, the receiving unit 140 may be separate from the gas suppression device 100. The receiving unit 140 may come in different types, shapes, sizes or materials. For example, the receiving unit 140 may be a storage space for a lithium-sulfur battery in an electronic device, a storage space for a lithium-sulfur battery pack in an EV or HEV, a storage chamber for a lithium-sulfur battery, a storage space for one or more lithium-sulfur batteries in an energy storage device or system, etc.

For example, the receiving unit 140 may have an empty space to receive, install, or store one or more lithium-sulfur batteries 10. In addition to the lithium-sulfur batteries 10, the receiving unit 140 may be configured to receive the voltage measurement unit 110, the current application unit 120 and the control unit 130 of the gas suppression device 100. Alternatively, the receiving unit 140 may just be a storage space to receive one or more lithium-sulfur batteries 10.

In an embodiment of the present disclosure, when the lithium-sulfur battery 10 is received in the receiving unit 140, the lithium-sulfur battery 10 may not be affected by the external environment. For example, the receiving unit 140 may be an enclosure and may prevent infiltration of external impurities or matter, thereby safely protecting the lithium-sulfur battery 10. In another embodiment, the receiving unit 140 may include impact absorbing structures for protecting the lithium-sulfur battery 10 and the voltage measurement unit 110, the current application unit 120 and the control unit 130 of the gas suppression device 100 according to the present disclosure from external mechanical influences (impacts, falls, etc.).

In an embodiment of the present disclosure, the gas suppression device 100 according to the present disclosure may further include a temperature measurement unit 150.

The temperature measurement unit 150 may be configured to measure a temperature of the lithium-sulfur battery 10. The temperature measurement unit 150 may measure the temperature using a temperature sensor. For example, the temperature measurement unit 150 may measure the temperature at one or more locations, such as the surrounding temperature of the gas suppression device according to the present disclosure, the surface temperature of the lithium-sulfur battery 10, the surrounding temperature of the lithium-sulfur battery 10, and/or the temperature of the receiving unit 140 when the lithium-sulfur battery 10 is received in the receiving unit 140.

The temperature measurement unit 150 may be configured to send the measured temperature information to the control unit 130. The measured temperature information may be, for example, the surrounding temperature of the gas suppression device according to the present disclosure, the surface temperature of the lithium-sulfur battery 10, the surrounding temperature of the lithium-sulfur battery 10, and/or the temperature of the receiving unit 140. Then, the control unit 130 may be configured to adjust the voltage measurement cycle (for example, the time interval at which the voltage is measured) of the voltage measurement unit 110 according to the temperature information measured by the temperature measurement unit 150.

In the embodiment, a reference temperature may be preset and pre-stored in the memory of the control unit 130 or any other component (for example, an external storage medium that is connected to or may be connected to the control unit, etc.). Additionally, the control unit 130 may compare the temperature measured by the temperature measurement unit 150 with the preset (and/or pre-stored) reference temperature. In this instance, when the temperature measured by the temperature measurement unit 150 is higher than the reference temperature, the control unit 130 may make the voltage measurement cycle of the voltage measurement unit 110 shorter.

For example, in case that the measured temperature is lower than the reference temperature and the voltage measurement cycle of the voltage measurement unit 110 is 100 sec, when the measured temperature is higher than the reference temperature, the control unit 130 may control the voltage measurement unit 110 so that the voltage measurement cycle is 10 sec, since the lithium-sulfur battery 10 may discharge faster at high temperature. According to the above-described embodiment, the voltage measurement cycle in the temperature range in which the discharge rate is high may be made shorter to apply the electric current immediately or faster when the lithium-sulfur battery 10 discharges, thereby improving the gas suppression effect.

On the contrary, when the temperature measured by the temperature measurement unit 150 is lower than the reference temperature, the control unit 130 may make the voltage measurement cycle of the voltage measurement unit 110 longer. Since the lithium-sulfur battery 10 may discharge slowly at low temperature, when the voltage measurement cycle of the voltage measurement unit 110 is made longer, it is possible to reduce the energy consumption due to frequent voltage measurements.

In an embodiment of the present disclosure, the current application unit 120 may be configured to apply the electric current to the lithium-sulfur battery 10 at the C-rate of 0.01 C or less. In the embodiment of the present disclosure, the current application unit 120 may be configured to apply the electric current to the lithium-sulfur battery 10 at the C-rate of 0.0005 C or more, 0.001 C or more or 0.005 C or more. In the embodiment of the present disclosure, the current application unit 120 may be configured to apply the electric current to the lithium-sulfur battery 10 at the C-rate of 0.01 C or less or 0.0005 C or more. The C-rate control operation of the current application unit 120 may be performed by the control unit 130.

For example, when the lithium-sulfur battery 10 applied to the device according to the present disclosure is discharged at a predetermined level or more, the current application unit 120 may apply the electric current at the C-rate of 0.02 C to 0.5 C. Additionally, the current application unit 120 may apply the electric current at the C-rate of 0.02 C or more, 0.05 C or more, 0.1 C or more, or 0.5 C or more. Furthermore, the current application unit 120 may apply the electric current at the set C-rate such as 2 C or less or 1 C or less. Further, the current application unit 120 may apply the electric current at set C-rates such as 0.02 C to 2 C, 0.05 C to 2 C, 0.05 C to 1 C, 0.1 C to 1 C, or 0.5 C to 1 C.

In particular, the current application unit 120 may be configured to change the C-rate according to the State Of Charge (SOC) of the lithium-sulfur battery 10. Further, the current application unit 120 may be configured to gradually decrease the C-rate when the SOC of the lithium-sulfur battery 10 increases.

For example, when the SOC of the lithium-sulfur battery 10 is equal to or lower than 97% (for example, 90% to 97%), the current application unit 120 may apply the electric current to the lithium-sulfur battery 10 at the C-rate of 0.02 C to 0.05 C or 0.02 C. Additionally, when the SOC of the lithium-sulfur battery 10 is higher than 97% (for example, 98% to 99.5% or 98% to 99.9%), the current application unit 120 may reduce the C-rate to 0.005 C to 0.01 C or 0.01 C and apply the electric current to the lithium-sulfur battery 10. That is, in the above-described exemplary configuration, the current application unit 120 may charge the lithium-sulfur battery 10 at a higher C-rate up to a predetermined level, and subsequently, when the lithium-sulfur battery 10 is charged at the predetermined level or more, may apply the electric current at a lower C-rate.

According to this exemplary configuration of the present disclosure, when the SOC of the lithium-sulfur battery 10 is low, the lithium-sulfur battery 10 may be charged fast, and when the SOC is high, the lithium-sulfur battery 10 may be safely charged. However, the electric current applied to the lithium-sulfur battery 10 is not limited to the above-described numerical range, and the electric current may be applied at C-rates enough to appropriately charge the lithium-sulfur battery 10 without overcharging the lithium-sulfur battery 10 or causing damage to the battery itself.

The gas suppression device 100 of the lithium-sulfur battery 10 according to the present disclosure may further include a temperature adjustment unit 160. The temperature adjustment unit 160 may be configured to adjust the temperature of the internal space of the receiving unit 140. For example, the temperature adjustment unit 160 may adjust the temperature to maintain the temperature of the receiving unit 140 at 40° C., 0° C. to 40° C., 10° C. to 40° C., 20° C. to 40° C. or room temperature (23° C.) according to a desired result. However, the temperature of the receiving unit 140 adjusted by the temperature adjustment unit 160 is not limited to the above-described temperature range and may be configured to maintain a variety of other temperatures suitable for the lithium-sulfur battery 10 according to the desired result.

According to the exemplary configuration of the present disclosure, the lithium-sulfur battery 10 may be stored at an optimal temperature, and the storage temperature may be the above-described range of temperatures. In particular, the lithium-sulfur battery 10 may discharge fast at high temperature situations, and the temperature adjustment unit 160 may adjust the internal temperature of the receiving unit 140 in which the lithium-sulfur battery 10 is stored, to prevent the rapid discharge of the lithium-sulfur battery 10.

Additionally, when the gas suppression device 100 according to the present disclosure includes the temperature measurement unit 150 together as in the above-described embodiment, the temperature measurement unit 150 may measure the temperature in the receiving unit 140 and send the measured information to the control unit 130. Then, the control unit 130 may determine if the temperature in the receiving unit 140 is more than or less than a preset reference range, and when it is determined that the temperature in the receiving unit 140 is more than or less than the preset reference range, the control unit 130 may control the temperature adjustment unit 160 to adjust the temperature in the receiving unit 140 to temperatures within the reference range. The temperature adjustment unit 160 may be controlled by the control unit 130, and may be or include either a cooler or a heater or both, and may correspond to a device having a temperature adjustment function.

In an embodiment of the present disclosure, the lithium-sulfur battery 10 received in the receiving unit 140 may be in a condition within 24 hours after the activation step. That is, the lithium-sulfur battery 10 may be received in the internal space of the receiving unit 140 within 24 hours after the activation step. That is, the lithium-sulfur battery applied to the gas suppression device according to the present disclosure may be in a condition within 24 hours from the end of the activation step, that is to say, immediately after the completion of the activation step.

Further, the lithium-sulfur battery 10 may be received in the internal space within hours after the activation step, and further, within 5 hours, and in one example, within 1 hour. When left alone, the lithium-sulfur battery 10 may self-discharge, and during discharging, lithium polysulfide may be produced. To prevent this, the lithium-sulfur battery 10 may be applied to the gas suppression device 100 according to the present disclosure within the time period range after the activation step. However, the present disclosure is not necessarily limited within the time period range, and the time period range may change depending on the condition in which the lithium-sulfur battery 10 is stored and placed, for example, temperature. For example, since the lithium-sulfur battery 10 self-discharges fast when placed at high temperature, the lithium-sulfur battery 10 may be applied to the gas suppression device 100 according to the present disclosure within a time period earlier than the time period range after the activation step. Alternatively, the lithium-sulfur battery 10 may be applied to the gas suppression device 100 according to the present disclosure within a time period later than the time period range after the activation step. The lithium-sulfur battery 10 may be charged and/or discharged at least once in the activation step, and gas may be generated during charging and/or discharging. The gas generated in the charging and/or discharging process may be removed. Subsequently, the charged lithium-sulfur battery 10 is received in the receiving unit 140, and when a long time (for example, more than 24 hours) has passed after charging, the lithium-sulfur battery 10 self-discharges and lithium polysulfide may be produced, and as a consequence, gas may be generated in the lithium-sulfur battery 10.

Accordingly, the lithium-sulfur battery 10 charged in the activation step may be received in the receiving unit 140 and the device according to the present disclosure as soon as possible. Preferably, the lithium-sulfur battery 10 may be received in the receiving unit 140 immediately after the activation step. However, the present disclosure is not necessarily limited to the time period range, and may be appropriately selected according to the process of manufacturing the lithium-sulfur battery 10.

In an embodiment of the present disclosure, the lithium-sulfur battery 10 having gone through the activation step may be charged to SOC of 90% or more. Since the gas suppression device according to the present disclosure may be configured to apply the electric current of 0.01 C or less to the lithium-sulfur battery 10 to prevent damage to the lithium-sulfur battery 10, when the SOC of the lithium-sulfur battery 10 having gone through the activation step is low, it may take a long time to fully charge the lithium-sulfur battery 10. Accordingly, the lithium-sulfur battery 10 applied to the gas suppression device according to the present disclosure may have the SOC in the above-described range. However, the SOC of the lithium-sulfur battery 10 having gone through the activation step is not limited to the above-described numerical range, and even the lithium-sulfur battery 10 having low SOC may be applied to the gas suppression device according to the present disclosure and charged by the gas suppression device according to the present disclosure.

Figure 3:
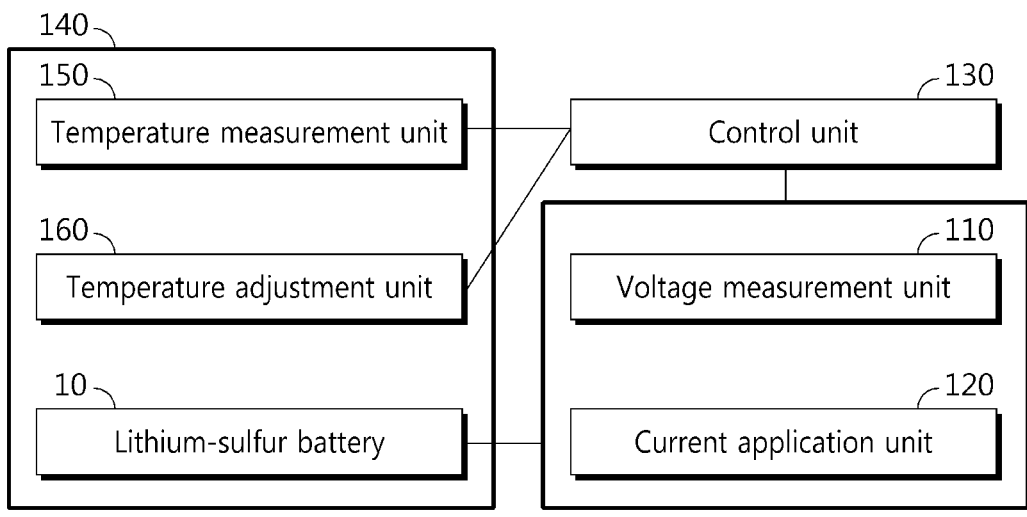
FIG. 3 is a block diagram of a gas suppression device according to another aspect of the present disclosure.

FIG. 3 is a block diagram of a gas suppression device according to another aspect of the present disclosure.

The receiving unit 140 may accommodate the lithium-sulfur battery 10, the temperature adjustment unit 160 and the temperature measurement unit 150. In an embodiment of the present disclosure, the receiving unit 140 may not include all the temperature adjustment unit 160 and the temperature measurement unit 150, and may include a temperature sensor, a cooler and/or a heater. The lithium-sulfur battery 10 may be connected to the voltage measurement unit 110 and the current application unit 120. The voltage measurement unit 110 may measure the voltage of the lithium-sulfur battery 10, and the current application unit 120 may apply the electric current to the lithium-sulfur battery 10. In this instance, the control unit 130 connected to the voltage measurement unit 110 and the current application unit 120 may compare the measured voltage with the reference voltage and control the current application unit 120 to apply the electric current to the lithium-sulfur battery 10. Additionally, the control unit 130 may be connected to the temperature measurement unit 150 and the temperature adjustment unit 160. The control unit 130 may receive the internal temperature of the receiving unit 140 measured by the temperature measurement unit 150, and when the received temperature is outside of the reference temperature range, the control unit 130 may control the temperature adjustment unit 160 to adjust the internal temperature of the receiving unit 140.

Figure 4:
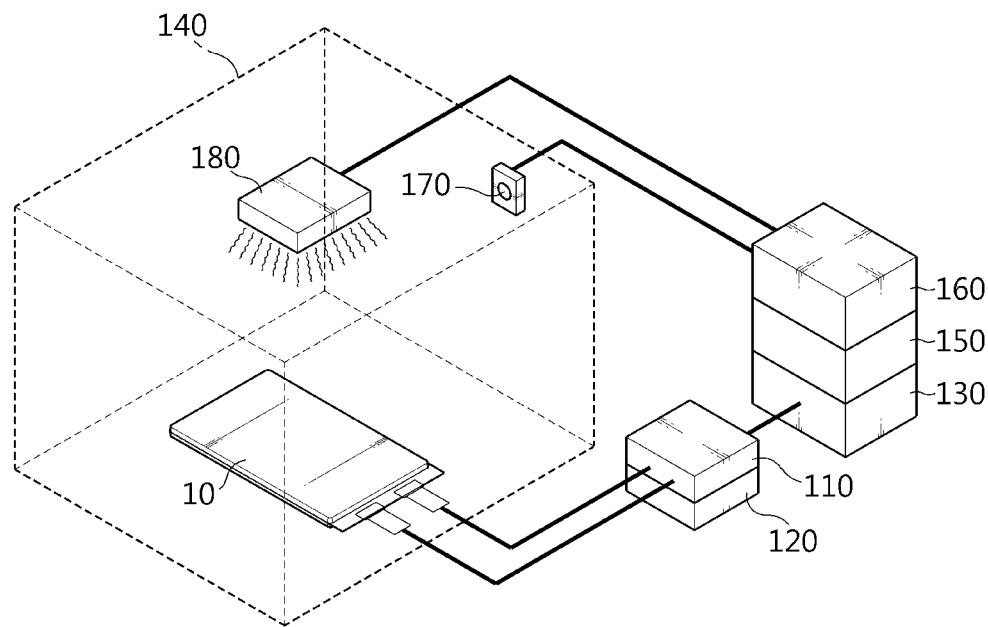
FIG. 4 is a perspective view of an application of a gas suppression device according an aspect of the present disclosure.

FIG. 4 is a perspective view of a storage chamber to which the gas suppression device is applied according to an aspect of the present disclosure. While FIG. 4 illustrates a storage chamber, the gas suppression device according to the present disclosure is also applicable to energy storage devices and energy storage systems.

The receiving unit 140 may accommodate the lithium-sulfur battery 10, and the temperature measurement unit 150 and the temperature adjustment unit 160 may be attached to the inner wall of the receiving unit 140. In this instance, the temperature measurement unit 150 and the temperature adjustment unit 160 may be spatially separated from each other.

The temperature measurement unit 150 and the temperature adjustment unit 160 may be disposed in the gas suppression device 100, and the temperature sensor unit 170 and the cooling/heating unit 180 may be disposed on the inner wall of the receiving unit 140. Specifically, the cooling/heating unit may be a compression/expansion refrigeration cycle system. In various embodiments, the cooling/heating unit may be a heat pump or a thermoelectric module using Peltier effect and the like. In one embodiment, the cooling/heating unit may be a fan/heating coil.

The voltage measurement unit 110 may be connected to the positive electrode lead and the negative electrode lead of the lithium-sulfur battery 10 through the positive electrode contact terminal and the negative electrode contact terminal to measure the voltage of the lithium-sulfur battery 10. Additionally, the control unit 130 may receive the measured voltage, and control the current application unit 120 to apply the electric current to the lithium-sulfur battery 10 to maintain the voltage of the lithium-sulfur battery 10 within the predetermined range based on the measurement result. Here, the current application unit 120 may apply the electric current to the lithium-sulfur battery 10 through the positive electrode contact terminal and the negative electrode contact terminal. The control unit 130 may receive the measured temperature from the temperature measurement unit 150 and control the temperature adjustment unit 160 to maintain the temperature in the receiving unit 140 within the preset range according to the measurement result.

Additionally, the temperature measurement unit 150 may measure the internal temperature of the receiving unit 140 through the temperature sensor unit 170, and send the measured temperature to the control unit 130. The control unit 130 may receive the measured temperature. Additionally, the control unit 130 may control the temperature adjustment unit 160 to adjust the temperature of the receiving unit 140 to maintain the internal temperature of the receiving unit 140 within the predetermined range based on the measured temperature result. The temperature adjustment unit 160 may control the cooling/heating unit 180 to adjust the temperature of the receiving unit 140.

Figure 5:
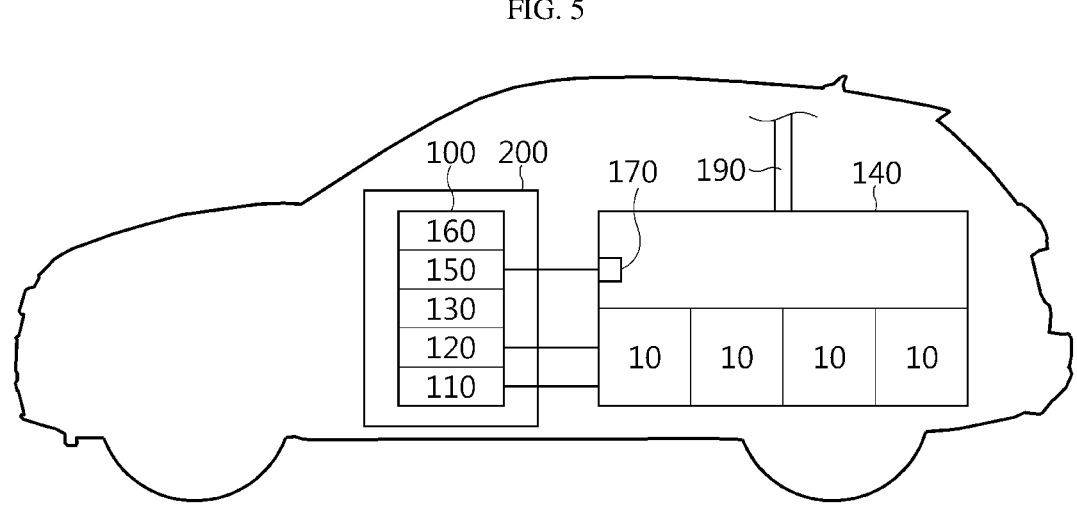
FIG. 5 is a perspective view of another application of a gas suppression device according another aspect of the present disclosure.

FIG. 5 is a perspective view of another application of a gas suppression device according to another aspect of the present disclosure, and illustrates a battery management system (BMS) 200 and a receiver 140 containing a battery pack including a plurality of lithium-sulfur batteries 10 in an electric vehicle (for example, EV or HEV).

The BMS 200 may manage the battery parameters of the battery pack. The battery parameters the BMS 200 manages may include the voltage of the battery pack, the voltage of the individual batteries, the temperature of the battery pack, the State Of Charge (SOC) of the battery and charge level of the battery pack, State Of Health (SOH) of the battery and balancing the batteries to have the same voltage across the battery pack, state of power (SOP) of the battery pack, and may further include factors associated with the batteries. The BMS 200 may include the gas suppression device 100 according to the present disclosure as part of the battery parameters management, and the gas suppression device 100 may use the voltage measurement unit and the temperature measurement unit included in the BMS 200. Alternatively, the gas suppression device 100 may be configured to use a separate voltage measurement unit and a separate temperature measurement unit.

Referring to FIG. 5, the receiving unit 140 may accommodate the battery pack including a plurality of lithium-sulfur batteries 10. The voltage measurement unit 110 may include a plurality of positive electrode contact terminals and a plurality of negative electrode contact terminals, and the positive electrode contact terminals and the negative electrode contact terminals may be connected to the respective positive electrode lead and the negative electrode lead of the lithium-sulfur batteries 10.

The control unit 130 may receive the voltage measurement result of the individual lithium-sulfur batteries 10, and control the current application unit 120 to apply the electric current to the individual lithium-sulfur batteries 10 to maintain the voltages of the individual lithium-sulfur batteries 10 within the predetermined range according to the received voltage measurement result of the individual lithium-sulfur batteries 10. The current application unit 120 may apply the electric current to the individual lithium-sulfur batteries 10 through the positive electrode contact terminals and the negative electrode contact terminals connected to the respective positive electrode lead and the negative electrode lead of the lithium-sulfur batteries 10.

The temperature measurement unit 150 may measure the internal temperature of the receiving unit 140 through the temperature sensor unit 170, and send the measured temperature to the control unit 130. Additionally, the control unit 130 may control the temperature adjustment unit 160 to adjust the temperature of the receiving unit 140 to maintain the internal temperature of the receiving unit 140 within the predetermined range based on the measured temperature result.

The air conditioning of the receiving unit 140 may be provided by an air conditioning system of the EV. Specifically, the air conditioned air by the air conditioning system of the EV may be supplied to the receiving unit 140 through a conduit 190 connected to the air conditioning system. The air conditioning system is an air control system and may be an air conditioner. For example, the air conditioning system may control the temperature, humidity, cleanliness and flow of air.

Figure 6:
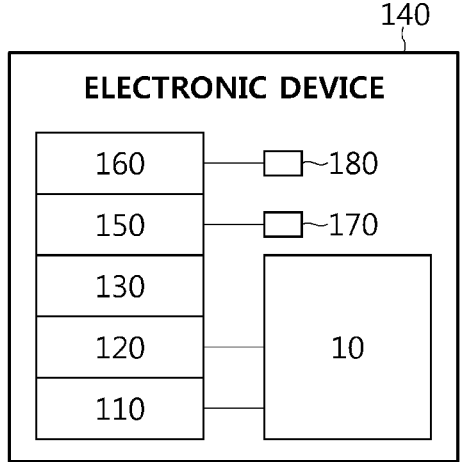
FIG. 6 is a perspective view of yet another application of a gas suppression device according to yet another aspect of the present disclosure.

FIG. 6 illustrates an electronic device with a gas suppression device according to yet another aspect of the present disclosure. The electronic device may include, for example, a mobile phone, a tablet, a laptop computer, a camcorder, and the like.

The receiving unit 140 may accommodate the lithium-sulfur battery 10, and the voltage measurement unit 110 may include the positive electrode contact terminal and the negative electrode contact terminal, and the positive electrode contact terminal and the negative electrode contact terminal may be connected to the positive electrode lead and the negative electrode lead of the lithium-sulfur battery 10. The control unit 130 may receive the voltage measurement result of the lithium-sulfur battery 10, and control the current application unit 120 to apply the electric current to the lithium-sulfur battery 10 to maintain the voltage of the lithium-sulfur battery 10 within a predetermined range according to the received voltage measurement result of the lithium-sulfur battery 10. Here, the current application unit 120 may apply the electric current to the lithium-sulfur battery 10 through the positive electrode contact terminal and the negative electrode contact terminal connected to the positive electrode lead and the negative electrode lead of the lithium-sulfur battery 10.

With respect to maintaining an internal temperature of the receiving unit 140, in an embodiment of the present disclosure, the gas suppression device may not include the cooling system. In another embodiment, the gas suppression device may include a fan as the cooling system.

In an embodiment, the temperature measurement unit 150 may measure the internal temperature of the receiving unit 140 through the temperature sensor unit 170, and send the measured temperature to the control unit 130. Additionally, the control unit 130 may control the temperature adjustment unit 160 to adjust the temperature at the receiving unit 140 and maintain the internal temperature of the receiving unit 140 within the predetermined range. Additionally, the temperature adjustment unit 160 may control the cooling/heating unit 180 to maintain the internal temperature of the receiving unit 140 within the predetermined range.

Figure 7:
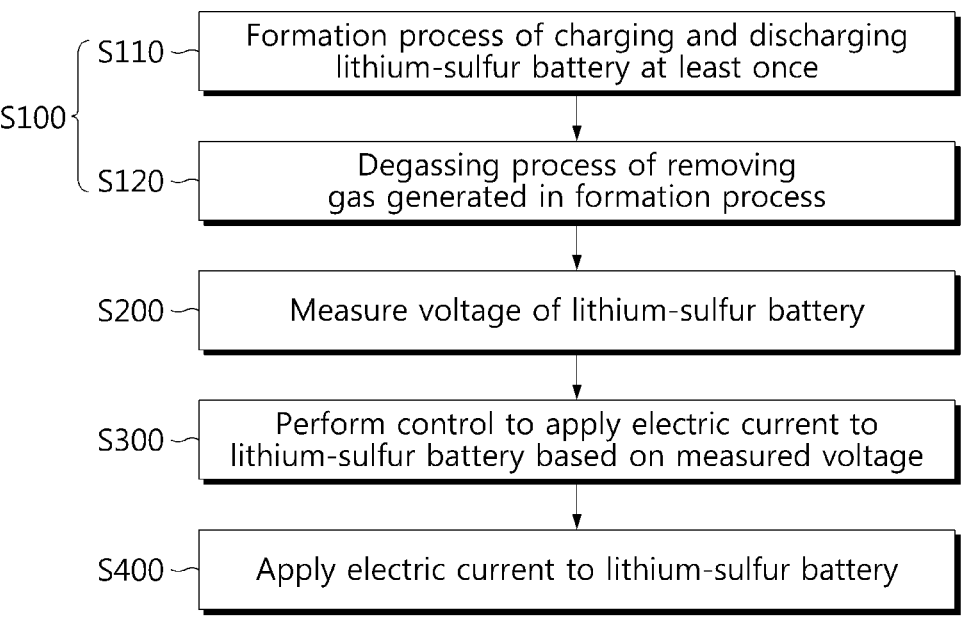
FIG. 7 is a flowchart of a gas suppression method for a lithium-sulfur battery according to an aspect of the present disclosure.

FIG. 7 is a flowchart of a gas suppression method for the lithium-sulfur battery according to an aspect of the present disclosure.

According to an aspect of the present disclosure, there is provided the gas suppression method for suppressing gas generation in the lithium-sulfur battery having gone through the activation step (S100), including measuring the voltage of the lithium-sulfur battery (S200); performing control to apply the electric current to the lithium-sulfur battery (S300); and applying the electric current to the lithium-sulfur battery (S400).

The activation step (S100) may include a formation process (S110) and a degassing process (S120). Here, the formation process (S110) refers to a process of determining the capacity of the battery by charging and discharging the battery at least once and activating the battery, and the degassing process (S120) refers to a process of removing gas generated in the formation process (S110). In the activation step (S110), gas may be generated by applying the electric current to the lithium-sulfur battery, and the generated gas may be removed. However, aside from applying the electric current to the lithium-sulfur battery in the activation step (S100), the gas suppression device according to the present disclosure may suppress gas generation by applying the electric current to the lithium-sulfur battery having gone through the activation step (S100).

The following steps may be performed by the control unit executing the instructions stored in the memory such as a semiconductor memory or external storage media.

The step (S200) of measuring the voltage of the lithium-sulfur battery may include measuring the voltage of the lithium-sulfur battery after the lapse of a predetermined time. The method for measuring the voltage of the lithium-sulfur battery is not limited to a particular method. For example, the voltage of the lithium-sulfur battery may be measured by connecting the positive electrode contact terminal and the negative electrode contact terminal of a voltage measurement unit to the positive electrode lead and the negative electrode lead of the lithium-sulfur battery, respectively.

The step (S300) of performing control to apply the electric current to the lithium-sulfur battery is the step of performing control to apply the electric current to the lithium-sulfur battery to maintain the voltage of the lithium-sulfur battery within the predetermined range based on the measured voltage.

The step (S400) of applying the electric current to the lithium-sulfur battery is the step of applying the electric current to the lithium-sulfur battery. The method of applying the electric current to the lithium-sulfur battery is not limited to a particular method. For example, when the current application unit applies the electric current to the lithium-sulfur battery, the electric current may be applied to the lithium-sulfur battery using the positive electrode contact terminal and the negative electrode contact terminal connected to the voltage measurement unit. Alternatively, the current application unit 1 may include a separate positive electrode contact terminal and a separate negative electrode contact terminal, and may apply the electric current to the lithium-sulfur battery using the same.

According to this exemplary configuration of the present disclosure, it may be possible to suppress gas generation in the lithium-sulfur battery. In particular, when the lithium-sulfur battery is exposed to a high temperature environment over the room temperature, according to the gas suppression method of the present disclosure, it may be possible to effectively suppress gas generation in the lithium-sulfur battery. Additionally, since gas generation is suppressed, it may be possible to prevent swelling of the lithium-sulfur battery and reduce explosion risks.

In an embodiment of the present disclosure, the activation step (S100) may include charging and discharging the battery at least once by applying the electric current at the C-rate of 0.02 C to 5 C. However, charging and discharging is not limited to the above-described C-rate range and any C-rate enough to charge the lithium-sulfur battery without damage may be contemplated.

According to an embodiment of the present disclosure, the step (S300) of performing control to apply the electric current to the lithium-sulfur battery 10 may include comparing the voltage measured in the voltage measurement step (S200) with the preset reference voltage and performing control to apply the electric current to the lithium-sulfur battery. Specifically, when the measured voltage is lower than the preset reference voltage, the current application unit may be controlled to apply the electric current to the lithium-sulfur battery.

In an embodiment of the present disclosure, the current application step (S400) may include applying the electric current to keep the voltage of the lithium-sulfur battery equal to or higher than the preset reference voltage. Specifically, the preset reference voltage may be 100%, 99%, 98%, or 95% of the full charge voltage of the lithium-sulfur battery. Lithium polysulfide may be produced during discharging of the lithium-sulfur battery, and gas may be generated, so it may be preferred to maintain the voltage of the lithium-sulfur battery at the full charge voltage.

In an embodiment of the present disclosure, the current application step (S400) may include applying the electric current at the C-rate of 0.01 C or less or 0.0005 C or more. However, the magnitude of the electric current applied in the current application step is not limited to the above-described range, and the electric current may be applied in the range in which the lithium-sulfur battery may be charged without damage.

In an embodiment of the present disclosure, the voltage measurement cycle of the voltage measurement step (S200) may be configured to measure the voltage of the lithium-sulfur battery periodically or aperiodically. For example, the voltage of the lithium-sulfur battery may be periodically measured every 5 seconds. Alternatively, the voltage may be measured in each specific cycle within the range of 0.01 sec to 100 sec. However, the voltage measurement cycle may change depending on situations such as the type or surrounding temperature of the lithium-sulfur battery.

In an embodiment of the present disclosure, the lithium-sulfur battery is received in a receiving unit, and the method may further include measuring the temperature at the receiving unit. The method of measuring the temperature at the receiving unit is not limited to a particular method. For example, a temperature measurement unit may be present inside of the receiving unit or on an inner wall of the receiving unit, and the temperature measurement unit may measure the temperature using the temperature sensor unit.

Additionally, the voltage measurement cycle of the voltage measurement step may be adjusted according to the measured temperature. For example, when the measured temperature is outside of the preset reference temperature range, the voltage measurement cycle may be adjusted. Specifically, when the measured temperature exceeds the reference temperature range, the voltage measurement cycle may be made shorter.

Since the lithium-sulfur battery may discharge fast at high temperature, the voltage measurement cycle may be made shorter to allow a current application unit to apply the electric current to the lithium-sulfur battery immediately when the lithium-sulfur battery is discharged. In contrast, since the lithium-sulfur battery may discharge slowly at low temperature, the voltage measurement cycle may be made longer to reduce the energy consumption by frequent voltage measurements.

Additionally, the gas suppression method according to the present disclosure may further include the step of adjusting the temperature. The temperature adjustment may be performed to maintain the preset reference temperature range, and may be performed to adjust the internal temperature of the receiving unit, and in particular, the surrounding temperature of the lithium-sulfur battery. For example, in case that the preset reference temperature is 10° C. to 20° C., when the measured internal temperature of the receiving unit is 30° C., the internal temperature of the receiving unit may be adjusted to 20° C.

The method for adjusting the temperature may be performed by a cooling/heating unit and is not limited to a particular method. The cooling/heating unit may be or include either a cooler or a heater or both, and the temperature may be adjusted using those having a temperature adjustment function.

In an embodiment of the present disclosure, the lithium-sulfur battery is received in the battery case, and the current application step may include applying the electric current such that a volume change of the battery case is 1% or less, 3% or less, 5% or less or 10% or less. When the gas suppression method according to the present disclosure is applied to the lithium-sulfur battery, it may be possible to suppress the production of lithium polysulfide, thereby suppressing gas generation, and thus the volume change of the battery case may meet the above-described range.

In an embodiment of the present disclosure, the gas suppression method for the lithium-sulfur battery may be applied when the lithium-sulfur battery is stored or received at 30° C. or more, 40° C. or more or 50° C. or more. Since the lithium-sulfur battery may discharge faster when it is stored or received at high temperature, in case that the lithium-sulfur battery is stored or installed in a high temperature range such as the above-described temperature range, when the gas suppression method according to the present disclosure is applied, it may be possible to suppress the production of lithium polysulfide, thereby suppressing gas generation. However, the gas suppression method according to the present disclosure is not limited to the above-described temperature range, and may be applied in any temperature range in which the lithium-sulfur battery may be stored and received or any temperature range in which the lithium-sulfur battery may normally work.

In an embodiment of the present disclosure, the gas suppression method for the lithium-sulfur battery may be applied when loads are not applied to the lithium-sulfur battery 10. Specifically, when power-consuming loads are not applied to the lithium-sulfur battery, the lithium-sulfur battery may be floating charged or equalizing charged, and the above-described gas suppression method according to the present disclosure may be applied.

In an embodiment of the present disclosure, the gas suppression method for the lithium-sulfur battery may be applied to the battery management system of the battery pack including the lithium-sulfur battery. For example, the battery management system may perform floating charging of the lithium-sulfur battery using the electric charge stored in the battery pack. Alternatively, the battery management system may perform floating charging of the lithium-sulfur battery from any other battery or a power supplier outside of the battery pack.

In an aspect of the present disclosure, the gas suppression method for the lithium-sulfur battery may include charging the lithium-sulfur battery until the lithium-sulfur battery is fully or partially charged; and floating charging the lithium-sulfur battery.

In an embodiment of the present disclosure, the floating charging step may be performed at the C-rate of 0.01 C or less. The floating charging of the lithium-sulfur battery may increase the life of the lithium-sulfur battery.

The floating charging is a method in which a charger, a battery and a load are connected in parallel, and power is supplied to the load during charging of the battery with electricity and power or current supplied by the charger, and the charger may include the above-described gas suppression device, and the battery may be the lithium-sulfur battery. When the power consumption of the load is high, during the floating charging, the power may be supplied to the load from the charger and the battery being charged at the same time. Additionally, the charger may take full responsibility for the power consumed by the load, and only charging current that is weak enough to compensate for self-discharge may be supplied to the battery.

The floating charging step may include maintaining the voltage of the lithium-sulfur battery at the full charge voltage or 95% or more of the full charge voltage.

The floating charging step may include floating charging at the C-rate of 0.01 C or less or 0.0005 C or more.

The floating charging step may include floating charging not to exceed the full charge voltage of the lithium-sulfur battery.

The floating charging step may include floating charging at a constant floating voltage of 2.4V or less per cell of the lithium-sulfur battery.

The floating charging step may include floating charging the lithium-sulfur battery when loads are not applied to the lithium-sulfur battery. For example, when the lithium-sulfur battery is connected to an electric vehicle, and the electric vehicle is parked and is not driving, the lithium-sulfur battery may be floating charged.

The floating charging step may include floating charging the lithium-sulfur battery for a preset time. For example, the preset time may be 1 hour to 10 hours but is not limited within the above-described time range.

The floating charging step may be performed at a regular interval when the temperature of the lithium-sulfur battery or the receiving unit accommodating the lithium-sulfur battery or the surrounding temperature of the lithium-sulfur battery is 30° C. or more. For example, when the surrounding temperature of the lithium-sulfur battery is 30° C. or more, the lithium-sulfur battery may be charged by floating charging for at the interval of 1 hour.

The floating charging step may be performed when the temperature of the lithium-sulfur battery or the receiving unit accommodating the lithium-sulfur battery or the surrounding temperature of the lithium-sulfur battery is 30° C. or more, or 40° C. or more.

In an aspect of the present disclosure, the method may include the floating charging step, and optionally, equalizing charging, automatic charging or recovery charging. The equalizing charging is a method of charging each battery with uniform voltage by charging with higher voltage by about 10% than the voltage of the battery to prevent non-uniform SOC and a potential difference due to a difference in characteristics between each battery when a set of batteries is used for a long time. The automatic charging is a method of equalizing charging at the early stage of charging according to how much the battery is discharged, and when it is fully charged, automatically changing to floating charging to continuously perform floating charging, and recovery charging is a method of charging with weak electric current for 40 to 50 hours by constant current charging, then discharging and charging again, and performing this process repeatedly multiple times to restore the electrode plate to the original condition.

In an embodiment of the present disclosure, the gas suppression method for the lithium-sulfur battery may be applied to the battery management system of the battery pack. Here, floating charging may be performed through the battery management system using the electric charge stored in the battery pack. Additionally, floating charging may be performed through the battery management system using the electric charge stored in the independent battery that is separate from the battery pack. Here, the battery management system may be applied to the electric vehicle or any other electric device.

In an embodiment of the present disclosure, the gas suppression method for the lithium-sulfur battery or the gas suppression device for the lithium-sulfur battery may be applied while the lithium-sulfur battery has an open circuit voltage (OCV) corresponding to partial or full charge. Specifically, the floating voltage may be supplied while the lithium-sulfur battery has OCV corresponding to partial or full charge.

Hereinafter, example and comparative example will be described in detail to describe the present disclosure in more detail. However, the example according to the present disclosure may be modified in many other forms, and the scope of the present disclosure should not be interpreted as being limiting to the following example. The example of the present disclosure are provided to describe the present disclosure thoroughly and completely for those skilled in the art.

Two lithium-sulfur batteries are equally manufactured as follows.

For a positive electrode active material, a sulfur-carbon composite is prepared, in which sulfur is loaded onto carbon nanotubes. In this instance, a weight ratio of the carbon nanotubes and the sulfur is 1:3. Polyacrylic acid (PAA) as a binder and carbon fibers as a conductive material are added to the positive electrode active material and mixed to prepare a positive electrode slurry. In this instance, the weight ratio of the positive electrode active material, the conductive material and the binder is 88:5:7.

For a negative electrode, lithium metal is prepared.

For an electrolyte, a mixture of 0.75M lithium bis(trifluoromethanesulfonyl)imide (LiTFSI) and 1 weight % of lithium nitrate ($LiNO_3$) dissolved in an organic solvent of 1,3-dioxolane and dimethyl ether (DOL:DME=1:1 (volume ratio)) is prepared.

The manufactured positive and negative electrodes are placed facing each other with a polyethylene separator having the thickness of 16 μm and porosity of 46% interposed between them, and embedded in a pouch-type battery case, and then 70 μl of the electrolyte is injected to manufacture a lithium-sulfur battery.

The manufactured two batteries undergo the formation process by discharging with 0.1 C until 1.8V, 20 min resting, and charging with 0.1 C until 2.4V. Subsequently, the batteries are left alone at 25° C. for 2 days to generate gas, and a degassing process is performed to remove the gas. Subsequently, each lithium-sulfur battery is received in the respective receiving unit, and the temperature of the receiving unit is set to 40° C. and the batteries are stored for 3 days.

Example 1

The gas suppression device according to the present disclosure is applied to one of lithium-sulfur batteries stored in the receiving unit. The voltage measurement unit of the gas suppression device measures the voltage of the lithium-sulfur battery every second, and when the SOC is less than 100%, the current application unit applies the electric current. In this instance, the applied electric current is set to be less than 0.01 C.

Comparative Example 1

The gas suppression device according to the present disclosure is not applied to the other lithium-sulfur battery stored in the receiving unit, and voltage measurement is only performed.

Figure 8:
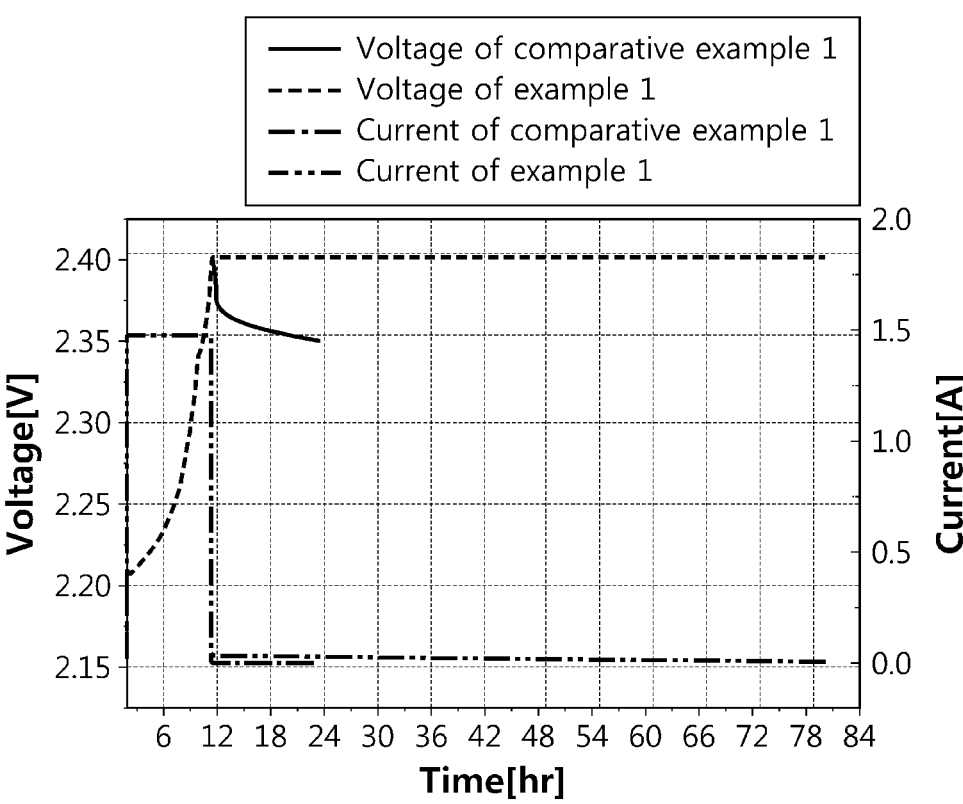
FIG. 8 is a voltage and current graph of lithium-sulfur batteries according to example 1 and comparative example 1.

FIG. 8 shows a voltage and current graph of the lithium-sulfur batteries according to example 1 and comparative example 1.

The lithium-sulfur batteries of example 1 and comparative example 1 are charged to 2.4V through the charging in the activation step. Subsequently, since the lithium-sulfur battery according to example 1 is applied to the gas suppression device according to the present disclosure, 2.4V is maintained. However, the lithium-sulfur battery of comparative example 1 discharges slowly and voltage decreases.

The volume change in the battery case of the lithium-sulfur batteries of example 1 and comparative example 1 is observed.

The lithium-sulfur battery according to example 1 has no volume change for 72 hours after storage, and it can be seen that gas generation in the lithium-sulfur battery is suppressed.

In contrast, the lithium-sulfur battery according to comparative example 1 has volume expansion when observed 24 hours after storage, and it can be seen that gas is generated in the lithium-sulfur battery.

Although the present disclosure has been hereinabove described with regard to a limited number of embodiments and drawings, the present disclosure is not limited thereto, and it is obvious to those skilled in the art that various changes and modifications may be made thereto within the technical aspect of the present disclosure and the appended claims and equivalents thereof.

DESCRIPTION OF REFERENCE NUMERALS

10: Lithium-sulfur battery
20: Battery case
30: Electrode assembly
40: Positive electrode lead
50: Negative electrode lead
60: Venting part
100: Gas suppression device
110: Voltage measurement unit
120: Current application unit
130: Control unit
140: Receiving unit
150: Temperature measurement unit
160: Temperature adjustment unit
170: Temperature sensor unit
180: Cooling/heating unit

What is claimed is:

1. A gas suppression device for suppressing gas generation in a lithium-sulfur battery having gone through an activation step, comprising:
a voltage measurement unit configured to measure a voltage of the lithium-sulfur battery;
a current application unit configured to apply an electric current to the lithium-sulfur battery; and
a control unit configured to control the current application unit to maintain the voltage of the lithium-sulfur battery within a predetermined range based on a voltage measurement result of the voltage measurement unit.

2. The gas suppression device for the lithium-sulfur battery according to claim 1, wherein the control unit is configured to compare the voltage measured by the voltage measurement unit with a preset reference voltage, and when the voltage measured by the voltage measurement unit is less than the reference voltage, control the current application unit to apply the electric current to the lithium-sulfur battery.

3. The gas suppression device for the lithium-sulfur battery according to claim 1, further comprising:
a receiving unit to receive the lithium-sulfur battery; and
a temperature measurement unit to measure a temperature in the receiving unit,
wherein the control unit is configured to adjust a voltage measurement cycle of the voltage measurement unit according to the temperature measured by the temperature measurement unit.

4. The gas suppression device for the lithium-sulfur battery according to claim 1, further comprising:

a receiving unit configured to receive the lithium-sulfur battery; and
a temperature adjustment unit configured to adjust a temperature in the receiving unit.

5. The gas suppression device for the lithium-sulfur battery according to claim 1, wherein the current application unit is controlled to apply the electric current of 0.01 C or less to the lithium-sulfur battery.

6. The gas suppression device for the lithium-sulfur battery according to claim 1, wherein the lithium-sulfur battery is not more than 24 hours after the activation step.

7. The gas suppression device for the lithium-sulfur battery according to claim 1, wherein the lithium-sulfur battery is charged such that a state of charge (SOC) is 90% or more.

8. A gas suppression method for suppressing gas generation in a lithium-sulfur battery having gone through an activation step, the method comprising:
measuring a voltage of the lithium-sulfur battery;
performing control to apply an electric current to maintain the voltage of the lithium-sulfur battery within a predetermined range based on a voltage measurement result; and
applying the electric current to maintain the voltage of the lithium-sulfur battery within the predetermined range by the control.

9. The gas suppression method for the lithium-sulfur battery according to claim 8, wherein the control step comprises comparing the measured voltage with a preset reference voltage, and when the measured voltage is less than the reference voltage, performing control to apply the electric current to the lithium-sulfur battery.

10. The gas suppression method for the lithium-sulfur battery according to claim 8, wherein the lithium-sulfur battery is received in a receiving unit, the method comprising:
measuring a temperature at the receiving unit, and
wherein a voltage measurement cycle is adjusted according to the measured temperature at the receiver.

11. The gas suppression method for the lithium-sulfur battery according to claim 10, further comprising:
adjusting the temperature in the receiving unit according to the measured temperature.

12. The gas suppression method for the lithium-sulfur battery according to claim 8, wherein the current application step comprises applying the electric current with 0.01 C or less.

13. The gas suppression method for the lithium-sulfur battery according to claim 8, wherein the lithium-sulfur battery is received in a battery case, and
wherein the current application step comprises applying the electric current such that a volume change of the battery case is 1% or less.

14. The gas suppression method for the lithium-sulfur battery according to claim 8, wherein the activation step comprises a process of charging and discharging the lithium-sulfur battery at least once.

15. The gas suppression method for the lithium-sulfur battery according to claim 8, wherein the activation step comprises charging and discharging the lithium-sulfur battery with the electric current of 0.02 C to 5 C.

16. The gas suppression method for the lithium-sulfur battery according to claim 8, wherein the lithium-sulfur battery is free of gas generated in the activation step.

* * * * *